(12) United States Patent
Zur Megede

(10) Patent No.: US 6,830,675 B2
(45) Date of Patent: Dec. 14, 2004

(54) METHOD AND DEVICE FOR REMOVING CARBON MONOXIDE FROM A GAS STREAM

(75) Inventor: Detlef Zur Megede, Kirchheim/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 303 days.

(21) Appl. No.: 10/093,828

(22) Filed: Mar. 11, 2002

(65) Prior Publication Data
US 2002/0134663 A1 Sep. 26, 2002

(30) Foreign Application Priority Data
Mar. 10, 2001 (DE) .......................................... 101 11 560

(51) Int. Cl.[7] ................................................. B01J 19/08
(52) U.S. Cl. ........................ 205/763; 205/765; 204/252; 204/228.1
(58) Field of Search ................................ 205/763, 765; 204/252, 228.1

(56) References Cited

U.S. PATENT DOCUMENTS
6,245,214 B1 * 6/2001 Rehg et al. .................. 205/764

FOREIGN PATENT DOCUMENTS
| EP | 0911898 | 4/1999 |
| JP | 02311302 | 12/1990 |
| JP | 2-311302 | * 12/1990 |
| WO | 00/16880 | 3/2000 |

* cited by examiner

Primary Examiner—Arun S. Phasge
(74) Attorney, Agent, or Firm—Crowell & Moring LLP

(57) ABSTRACT

A method for removing carbon monoxide from a gas stream, in which the gas stream loaded with CO is guided through a device, and the CO is removed from the gas stream through adsorption on the working electrode. As a function of an electrical voltage between the working electrode and the counter electrode, or between the working electrode and the reference electrode, an electrode cleaning mode is enabled by triggering a current flow between the working electrode and the counter electrode, and the CO adsorbed on the working electrode is oxidized to $CO_2$.01.

15 Claims, 2 Drawing Sheets

METHOD AND DEVICE FOR REMOVING CARBON MONOXIDE FROM A GAS STREAM

BACKGROUND AND SUMMARY OF THE INVENTION

This application claims the priority of German Application No. 101 11 560.1-43 filed Mar. 10, 2001, the disclosure of which is expressly incorporated by reference herein.

The invention relates to a method and a device for removing carbon monoxide from a gas stream.

In fuel cells, hydrogen and oxygen react to form water while yielding an electrical current. The efficiency of the fuel cell depends, among other things, on the purity of the reactants. The production of hydrogen, e.g., for PEM fuel cell systems, from carbon-containing substances, such as methanol, benzine, naphtha, methane, etc., requires some sort of reforming in a gas production system. This may be steam reforming, partial oxidation or autothermal reforming. In these processes, in which hydrogen is produced from a liquid or a gaseous fuel by reforming, the fuel stream does not consist of pure hydrogen but includes other, partially undesirable, components. Particularly the carbon monoxide (CO) that is produced in this process presents a problem, since it is harmful to many catalysts—not just in fuel cells—and, furthermore, may not be emitted into the environment. Its proportion in the reformate stream must consequently be reduced to a range clearly below 100 ppm.

There are various known techniques to reduce undesirable components. Membrane processes use membranes that are more or less permeable to hydrogen to eliminate impurities. One hundred percent selectivity to hydrogen is offered only by palladium-containing membranes, which today are still very expensive and difficult to process. Other materials allow not only hydrogen to pass through but also undesirable impurities, so that additional purification steps are required. All these types require a pressure drop as the driving force for permeability, which means an increased expenditure of energy.

Shift reactors use the water-gas shift equilibrium to reduce the CO content with the addition of water. A temperature dependent reaction equilibrium is established, in which CO and water form $CO_2$ and hydrogen and, conversely, $CO_2$ and hydrogen form CO and water.

The CO content can also be reduced by selective oxidation of the CO with the addition of air, whereby $CO_2$ is formed.

Both of these processes are well suited for primary purification, since they can lower the carbon monoxide content to approximately 0.1 vol.-% at relatively low cost. Thereafter, for a further reduction to the desired concentration, the temperature of the reaction must be reduced for reasons of equilibrium. Both shift reaction and selective oxidation, however, are slow at the required low temperatures. As a consequence, they require an increased amount of catalysts resulting in either large reactors (shift stages) or simply higher costs due to an increased precious metal content (CO oxidation). Furthermore, for full function, the catalysts must be brought to a defined operating temperature. In the case of selective oxidation, air must be added in metered quantities, which entails costly equipment. The introduced air, due to the nitrogen contained therein, moreover dilutes the hydrogen stream, which is undesirable under certain circumstances.

Primary purification is possible without great complexity, e.g., by means of membranes with low selectivities, selective oxidation stages, or shift reactors. In contrast, eliminating the approximately 0.1 vol.-% CO residue remaining in the reformate stream after primary purification poses greater challenges.

WO 00/16880 A1 discloses a method which removes CO from a hydrogen rich fuel by means of a catalytic material that preferentially adsorbs CO. The catalytic material is regenerated by an oxidizing agent, which reacts with the adsorbed CO. The reaction is initiated by an electrical current and makes use of the CO property whereby it is capable of quickly and completely covering the surface of many substances. This is one reason for its toxicity and its harmful influence on PEM fuel cells. Subsequently, the adsorbed amount of CO is electrochemically oxidized. The $CO_2$ thus formed does not continue to adhere to the surface, which is free to be recoated. For electrochemical oxidation, a voltage is applied between a working electrode and a counter electrode, which are separated by an ion conducting membrane, so that an electrical current can flow across the membrane. This causes problems, however, if the degree of CO coverage is too high.

Thus, the object of the invention is to provide a method and a device for removing carbon monoxide from a gas stream, which obviates these problems.

The invention provides an electrochemical cell in which a membrane-electrode unit is configured so way that a reference electrode, which is independent of the current flow, is provided in a counter electrode, in order for the oxidation conditions for CO removal to be detected and/or adjusted independently from the coating state of the working electrode.

Other objects, advantages and novel features of the present invention will become apparent from the following detailed description of the invention when considered in conjunction with the accompanying drawings.

BRIEF DESCRIPTION OF THE DRAWINGS

The invention will now be described in greater detail with reference to the attached drawing in which.

The device is suitable particularly for secondary purification of a reformate in fuel cell systems, in which the reformate has already undergone primary purification and the original CO content has been reduced to a range of below 1 vol.-%.

Figure 1:
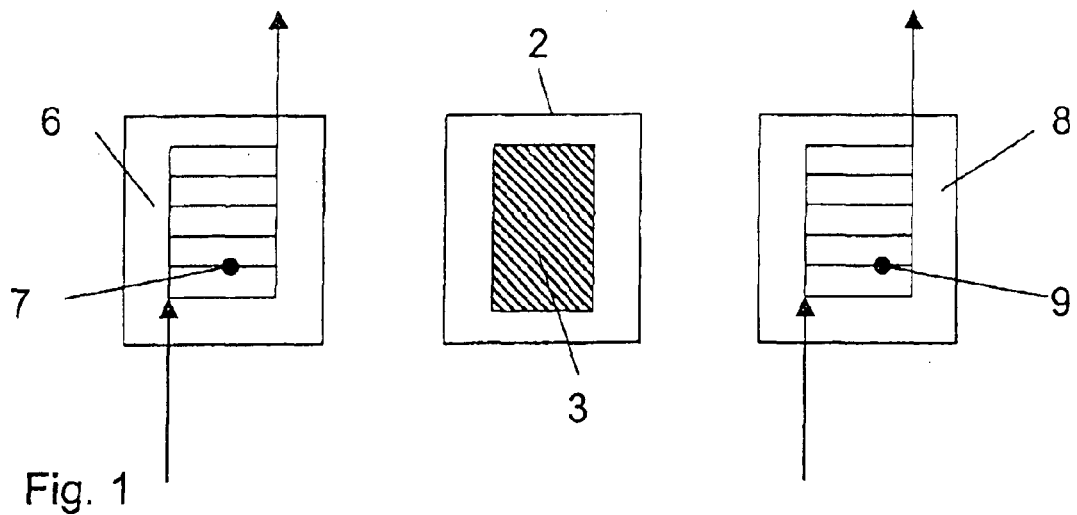
FIG. 1 is a top view of two contact plates and a membrane-electrode unit.

Details of a device according to the invention are shown in FIG. 1. This figure depicts a first contact plate 6 with channels 7 and a second contact plate 8 with channels 9 as well as a membrane-electrode unit with a membrane 2 and an electrode 3 of a gas purification unit. The contact plates 6, 8 and the membrane 2 are shown in a top view in which the elements are spatially stretched apart. Membrane 2 is preferably a polymer electrolyte membrane.

Figure 2:
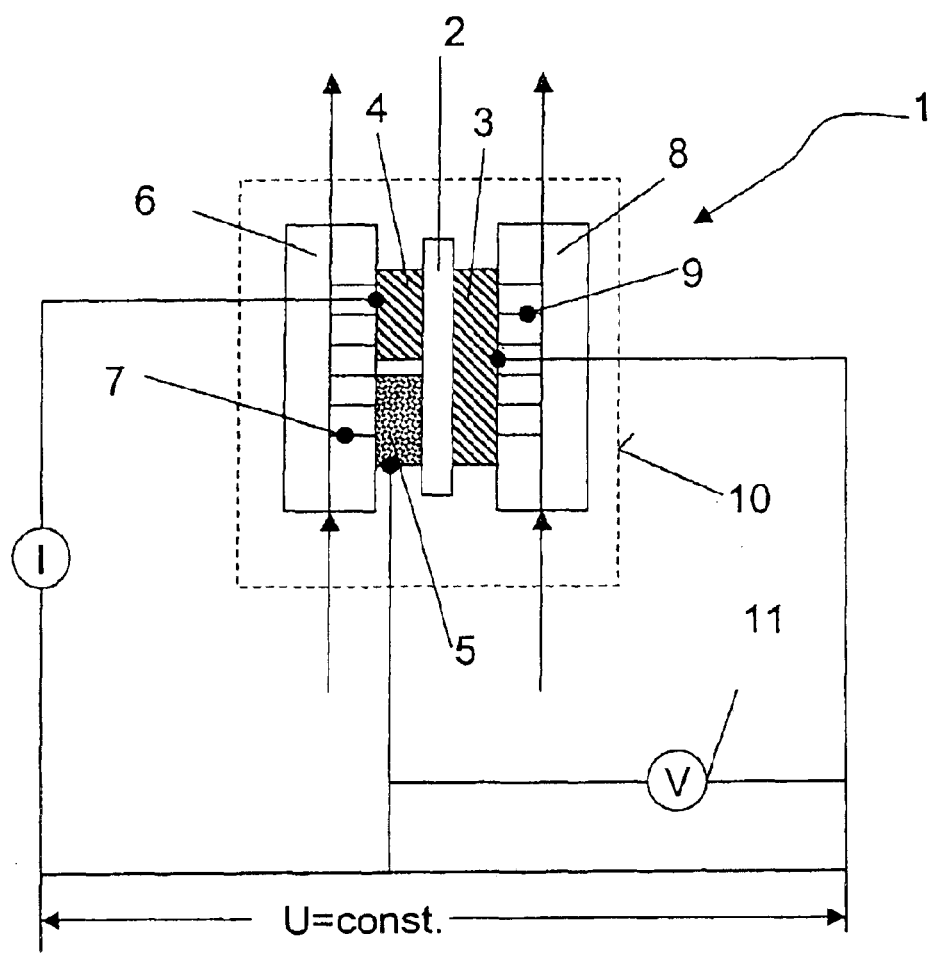
FIG. 2 is a schematic view of a cell with a membrane-electrode unit and electrical connections.

FIG. 2 is a schematic side elevation of the device. The membrane-electrode unit comprises membrane 2 and two electrodes, i.e., a working electrode 3 and an electrode 4, 5, which is separated into two parts by membrane 2. A current flows through a first part of electrode 4, 5, which forms the counter electrode 4, whereas no current flows through a second part, which is separated therefrom and forms the reference electrode 5. The reference electrode can be enclosed by the counter electrode 4 or arranged next to it or even above or below it and it can be separated from the counter electrode 4 by an insulating layer (not shown). Counter electrode 4 and reference electrode 5 are electrically separated from one another. The voltage between reference electrode 5 and working electrode 3 is used to regulate the current flow I between the counter electrode 4 and the working electrode 3 corresponding to a potentiostatic circuit, which is known per se. The electrical voltage U between the counter electrode 4 and the working electrode 3 is regulated to the voltage set between the reference electrode 5 and the working electrode 3. The voltage U between the reference electrode 5 and the working electrode 3 is measured at zero current.

The particular advantage of reference electrode 5, which is partitioned off from counter electrode 4, is that the CO oxidation parameters can be carried out at a constant potential by defining a constant potential across the reference electrode 5. Any change in the electrical potential at the counter electrode 4 or the working electrode 3 due to CO coating does not affect the CO oxidation parameters, and CO oxidation can instead take place independently thereof under defined conditions. This is made possible by the currentless reference electrode 5.

The working electrode 3 comprises a carbon monoxide adsorbing material, preferably platinum. The catalytically active centers of the platinum surfaces are almost completely covered by CO at temperatures of, for instance, less than 100° C. This effect is used here to remove CO from a reformate stream, since the affinity of CO to the surface is so great that it is practically selectively adsorbed. The required amount of platinum can be estimated as follows.

For each active platinum atom, 0.5-1 CO molecule is adsorbed. Assuming that 50% of the platinum present is catalytically active, this results in a requirement of approximately 4 mole of platinum for each mole of CO to be removed. Assuming a reformate stream of 100 $Nm^3/h$ and a CO content in the reformate of 0.1 vol.–% (1000 ppm), this results in a required platinum mass of 0.3 mole, i.e., about 60 g, to completely absorb the CO amount accumulated per minute, or 1 g of platinum per second. For higher CO concentrations, correspondingly more platinum is required.

The adsorbed CO amount is electrochemically oxidized to $CO_2$, which does not adhere to the platinum surface, so that this surface then becomes free and available for recoating with CO. Electrochemical oxidation is effected by applying an electrical voltage between the counter electrode 4 and the working electrode 3 so that an electrical current starts to flow between the two electrodes 3, 4. A similar principle is used in commercial sensors for measuring the CO content in gases. To oxidize the CO amount from the above calculation, a current of approximately 230 A is required according to Faraday's law. The voltage required for this purpose is about 2 V. The electrical output is approximately 460 W, i.e., roughly 0.5 kW. The reference electrode 5 ensures that the CO oxidation conditions can be adjusted in a defined manner and independent of working electrode 3.

Assuming that 1 g of platinum is sufficient to absorb the amount of CO accumulated in 1 second, one obtains, at a required current of 230 V, depending on the current density, a required electrode surface of 230 $cm^2$ at 1.0 $A/cm^2$ and 0.43 mg $Pt/cm^2$, or an electrode surface of 1150 $cm^2$ at 0.5 $A/cm^2$ and 0.22 mg $Pt/cm^2$, or an electrode surface of 2300 $cm^2$ at 0.1 $A/cm^2$ and 0.05 mg $Pt/cm^2$. An electrode surface of 230 $cm^2$ approximately corresponds to an edge length of 15 cm ·15 cm of a preferred working electrode 3.

Preferably, the arrangement of membrane 2, working electrode 3 and electrode pair 4, 5 forms a cell 1 in the manner of a fuel cell. Cell 1 has a housing 10, which encloses the contact plates 6, 8 and the membrane-electrode unit with membrane 2 and electrodes 3, 4, 5 arranged therebetween. The contact plates 8, 9 are provided for supplying gas and/or current and for bonding the electrodes 3, 4, 5. The flow channels 7, 9 are advantageously configured such that the pressure loss of the media in channels 7, 9 is minimized.

The reformate to be purified flows within channels 9 of contact plate 8 and through said channels 9 reaches the working electrode 3. At the working electrode, the CO, which is carried along in the gas stream, is adsorbed and the purified reformats leaves contact plate 8 via channels 9. This is indicated in the figure by the arrows.

Most preferably the electrode pair 4, 5 is integrated in the stream of an oxidizing medium, preferably an air stream, on the membrane side opposite the working electrode 3. There, the air flows through channels 7 of contact plate 6 and reaches electrode pair 4, 5. Since the reference electrode 5 has no current flowing through it, the gas purification unit will continue to operate even if the working electrode 3 is completely covered with CO, since the potential for oxidation can be predefined as a constant value via the reference electrode 5. If the counter electrode 4 spatially coincides with the reference electrode 5, as is the case in the prior art, the applied voltage changes during oxidation. As a result, it is necessary to ensure that the working electrode is not completely covered with CO but that oxidation is carried out before the active surface is completely covered with CO. Furthermore, a change in the potential can occur during oxidation, so that oxidation is driven too far, and undesirable product water that forms in the membrane area is decomposed. Due to the currentless reference electrode 5, which is separated from the counter electrode 4, operability is maintained irrespective of the coverage of the working electrode and any shift in potential can be prevented by keeping the voltage at the reference electrode constant or at least limited to non-critical values.

Preferably, means for measuring the voltage are provided at the reference electrode 5 so that a constant potential can be adjusted. If the reference electrode 5 is a pure oxygen electrode that is independent from the current flow, the electrical potential must be sufficiently large to oxidize the CO. Preferably a value greater than 1200 mV is used. At the same time, it is possible to ensure that the oxidation voltage for CO does not reach the range of water electrolysis. To this end, the potential at the oxygen reference electrode 5 is limited to a maximum value of 1700 mV.

It is also possible to provide means for measuring the voltage and/or current between the working electrode 3 and the counter electrode 4. If there is no current flow or low current flow, the electrical voltage between the working electrode 3 and the counter electrode 4 indicates the degree of coverage of the working electrode 3 with CO, since the hydrogen oxidation voltage being established collapses rapidly under the influence of CO. For the indicated reformate streams of approximately 100 $Nm^3/h$, this should occur after about 1 second. The duration of the current surge for CO oxidation should therefore be clearly shorter than the coverage period, in this case clearly less than one second, so that the cleaned surface of the working electrode 3 is available again as quickly as possible. Thus, an intermittent supply with a purified reformate stream is effected. The purified reformate can be either intermittently stored or directly supplied to a consumer, e.g., a fuel cell unit.

Figure 3:
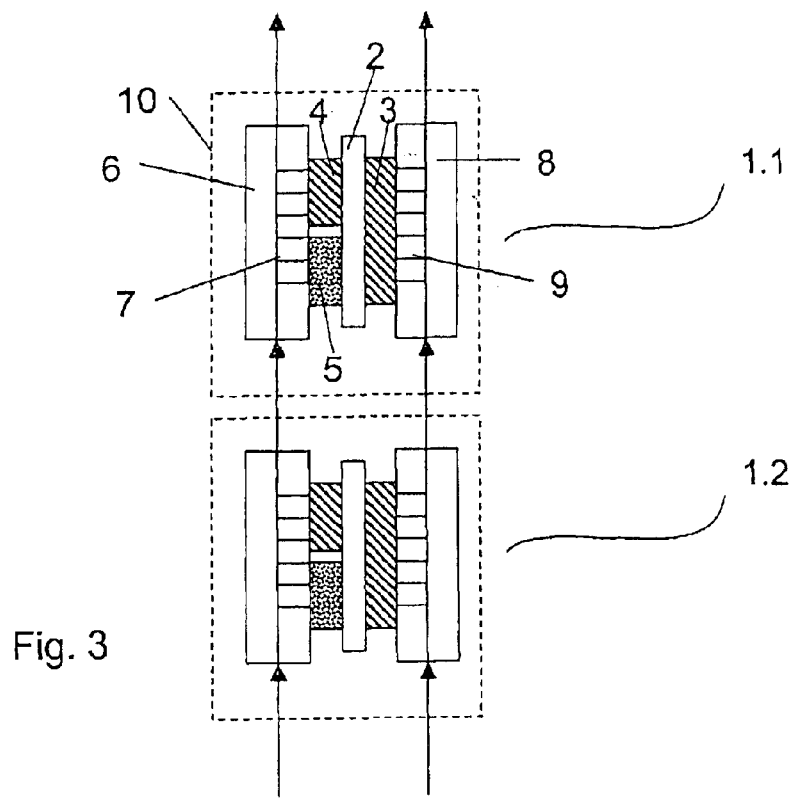
FIG. 3 shows two cells connected in series.

FIG. 3 shows a preferred further development of the invention. Here, several cells 1.1, 1.2 are connected in series in the flow direction of the gas to be purified. For the sake of clarity, only the components of the one cell 1.1 are provided with reference numerals. Preferably, cells 1.1 and 1.2 are identically constructed.

The series arrangement of cells 1.1, 1.2 allows continuous operation of the gas purification unit. At the start, neither of the two cells 1.1, 1.2 is loaded with CO. The gas to be purified initially flows through the first cell 1.1, where it gives off CO to working electrode 3 and then flows practically CO-free through the second cell 1.2. When the first cell 1.1 is loaded with CO, which is indicated, for instance, by the voltage between working electrode 3 and counter electrode 4, the first cell 1.1 switches to electrode cleaning mode and the second cell 1.2 takes over the removal of CO from the reformate. In electrode cleaning mode, a predefined constant voltage is applied to the reference electrode 5 of the first cell 1.1 in which the CO on the working electrode 3 is then oxidized with a short current pulse. The second cell 1.2 then switches to electrode cleaning mode and the first cell 1.1 is again being loaded with CO. This arrangement permits a cleaning time for a loaded cell on the order of magnitude of the loading time, i.e., an approximately one second cycle time.

In an advantageous operating mode, a current flow between working electrode 3 and counter electrode 4 is triggered as a function of an electrical voltage between working electrode 3 and counter electrode 4 and/or reference electrode 5 by applying a predefined electrical voltage $U_{Ref}$ to the reference electrode 5. For an oxygen reference electrode, this voltage $U_{Ref}$ is preferably selected between 1200 and 1700 mV. The trigger criterion can be the collapse of the hydrogen oxidation voltage with increasing CO coverage of the working electrode 3.

Figure 4:
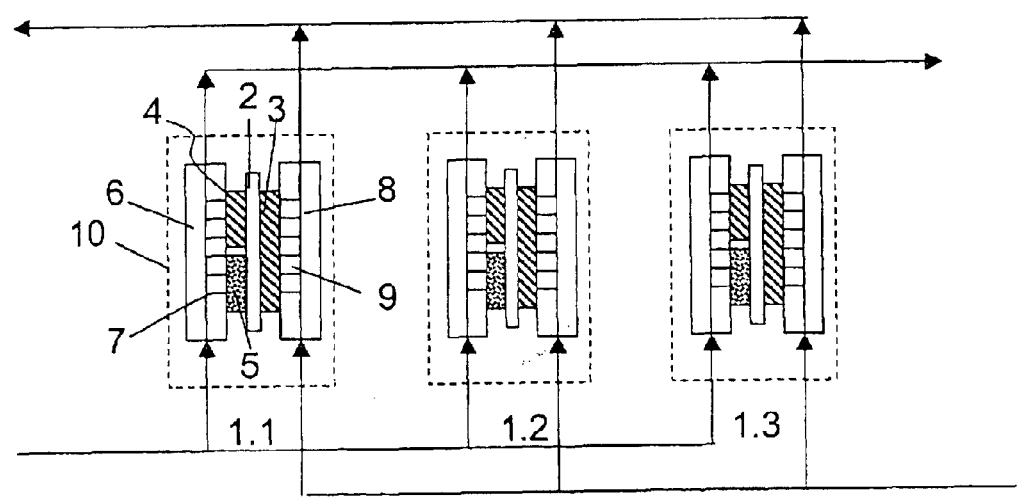
FIG. 4 shows three cells connected in parallel.

In case of a higher CO concentration or a lower achievable current density in CO oxidation, the cells may be connected in parallel in flow direction of the gas to be purified, as illustrated in FIG. 4 by means of a parallel connection of 3 cells 1.1, 1.2, 1.3. For the sake of clarity, again only one cell 1.1 has been provided with reference numerals. It is also possible to connect a parallel connection of cells 1.1, 1.2, 1.3 in series with a parallel connection of additional cells to permit continuous operation corresponding to the example illustrated in FIG. 3 even at low electrical current densities during CO oxidation and/or at high CO concentrations. The number of cells 1, 1.1, 1.2, 1.3 is preferably adapted to the tolerable current density of the cells.

The invention makes possible gas purification that permits immediate operability without preheating. This is particularly advantageous in fuel cell systems that are used in motor vehicles. The gas cleaning unit is a compact reactor comparable to a fuel cell and can even be integrated in a fuel cell stack, preferably a PEM fuel cell stack.

The operating cost for the device is low. Purifying the gas requires no special air metering, as is the case, for instance, in a conventional gas purification unit in a fuel cell system where CO is removed by selective oxidation. This avoids particularly the dilution of the reformate stream by additionally supplied air nitrogen.

If shift stages are used exclusively for the primary purification of hydrogen rich reformate before supplying it to the inventive device, no nitrogen is introduced into the hydrogen, and air metering can be eliminated entirely. Here, substantially pure $H_2/CO_2$ mixtures are formed. The device has a long service life and requires little or practically no maintenance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for removing carbon monoxide from a gas stream comprising the steps of:

guiding of a gas stream loaded with CO through a device;

removing of the CO from the gas stream through adsorption on a working electrode by enabling an electrode cleaning mode wherein current flow between the working electrode and a counter electrode is regulated as a function of an electric voltage between the working electrode and a reference electrode to thereby provide that the CO adsorbed on the working electrode is oxidized to $CO_2$.

2. The method according to claim 1, wherein a constant electrical potential is applied to the reference electrode.

3. The method according to claim 1, wherein electrical potential of between 1200 mV and 1700 mV is applied to the reference electrode.

4. The method according to claim 1, wherein the gas stream to be purified flows through a first cell and loads this first cell with CO and subsequently the gas stream flows through a second cell wherein the first cell is switched to electrode cleaning mode, and the gas stream to be purified loads the second cell with CO during the electrode cleaning mode.

5. The method according to claim 4, wherein the electrode cleaning mode and the loading with CO cyclically alternate between the first and second cells.

6. An apparatus for removing carbon monoxide from a gas stream by guiding the gas stream loaded with CO through a device and removing the CO from the gas stream through adsorption; said apparatus comprising:

a membrane;

a working electrode arranged on one side of said membrane; and a counter electrode spaced apart from said working electrode by said membrane, wherein said working electrode comprises a carbon monoxide adsorping material and wherein said counter electrode is separated from a reference electrode which reference electrode is outside a path of current flow between said working electrode and said counter electrode.

7. An apparatus according to claim 6, wherein the membrane and the counter electrode, the reference electrode and the working electrode form a cell.

8. An apparatus according to claim 7, wherein there are a plurality of said cells and they are configured in the manner of a fuel cell with a membrane-electrode unit and contact plates.

9. The apparatus according to claim 7, wherein the contact plates are provided for supplying one of gas and current to the counter electrode and the working electrode.

10. The apparatus according to claim 6, wherein a plurality of cells are connected in series in a flow direction of the gas.

11. The apparatus according to claim 6, wherein a plurality of cells are connected in parallel in flow direction of the gas.

12. The apparatus according to claim 6, wherein the working electrode is integrated into the gas stream.

13. The apparatus according to claim 6, wherein the counter electrode is arranged in an air stream.

14. The apparatus according to claim 6, wherein the CO adsorbing material is a precious metal.

15. The apparatus according to claim 6, further including means for measuring one of a voltage at the reference electrode and a current between the working electrode and the counter-electrode.

* * * * *